R. F. ROGERS.
FITTING FOR ATTACHING MOTOR CYCLE SIDE CARS.
APPLICATION FILED AUG. 9, 1918.
1,283,311.
Patented Oct. 29, 1918.
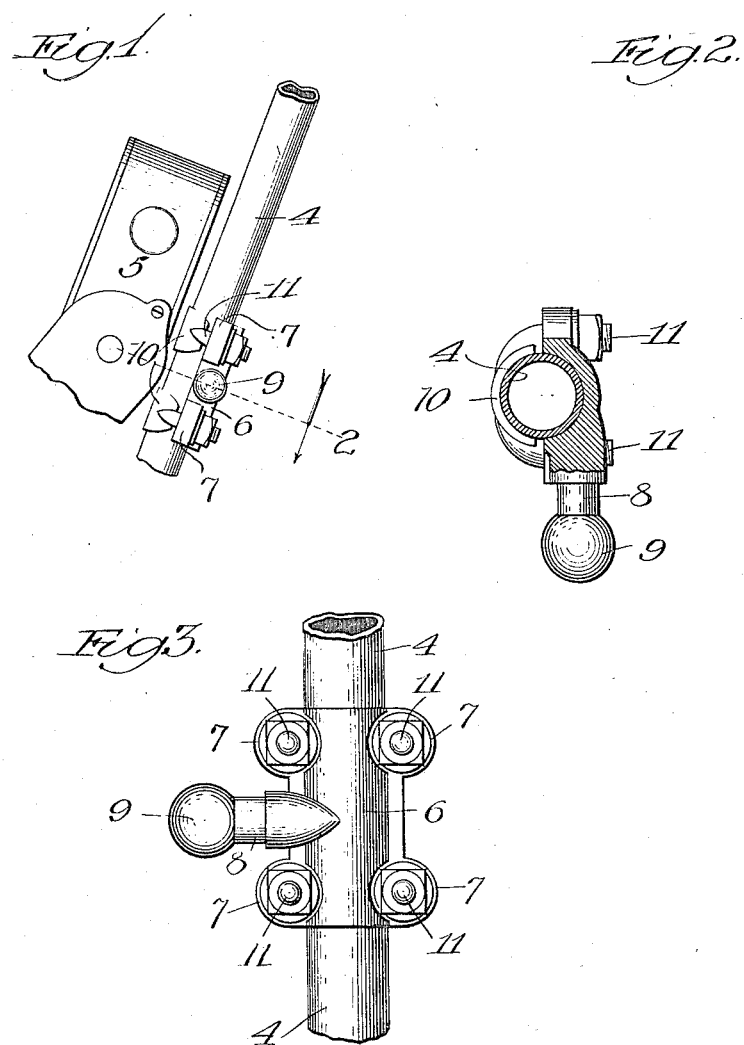

UNITED STATES PATENT OFFICE.

RALPH F. ROGERS, OF CHICAGO, ILLINOIS.

FITTING FOR ATTACHING MOTOR-CYCLE SIDE CARS.

1,283,311.　　　　　Specification of Letters Patent.　　Patented Oct. 29, 1918.

Application filed August 9, 1918. Serial No. 249,164.

*To all whom it may concern:*

Be it known that I, RALPH F. ROGERS, a citizen of the United States, residing at Chicago, in the county of Cook and State of Illinois, have invented a new and useful Improvement in Fittings for Attaching Motor-Cycle Side Cars, of which the following is a specification.

My invention relates to certain new and useful improvements in fittings for attaching motorcycle side-cars, and is fully described and explained in the specification and shown in the accompanying drawings, in which—

Figure 1 is a side elevation of my improved device in use; Fig. 2 is a section on the line 2 of Fig. 1, and Fig. 3 is a bottom plan of the device.

Referring to the drawings—

4 is the bar of a motorcycle frame and 5 is a diagrammatic representation of the magneto which is commonly provided on certain machines in the position illustrated. In order to secure the most desirable point of attachment, it is important to reach the bar 4 immediately adjacent to the magneto, and the extremely narrow clearance which is provided in practice has necessitated the devising of the present structure which not only serves the purpose, but is peculiarly simple and convenient.

6 is a heavy curved plate or forging formed to fit the bar of the motorcycle and provided with four ears 7 at its corners. The plate 6 is provided with a laterally extending neck 8 in its own plane, the said neck terminating in a ball 9. Two clips 10 are provided of curved form to surround the bar of the motorcycle. These are made very thin so as to fit tubing of different diameters and each terminates at its two ends in machine-threaded parts 11.

In positioning the device upon the motorcycle frame, the clips 10 are placed over the bar with their threaded extensions projecting forward and they are then slipped down the bar to the proper position, their thin central portions passing readily between the bar and the magneto. The plate 6 is then placed in position and bolted firmly to place. The ball projection 9 thus secures a firm support, precisely in the desired position.

I realize that considerable variation is possible in the details of this construction without departing from the spirit of my invention; therefore I do not intend to limit myself to the specific form herein shown and described except as pointed out in the following claims, in which it is my intention to claim all the novelty inherent in the construction as broadly as is permitted by the state of the art.

What I claim as new and desire to secure by Letters Patent is:

The herein-described device for attaching motorcycle side-car frames, comprising a heavy plate channeled to engage the bar of a motorcycle adapted to be fitted to the forward side thereof, said plate being of rectangular form and provided with perforate ears at its four corners and at its center with an integral extension lying in its plane and terminating in a spherical head, and two U-shaped clips with thin flexible central portions each terminating at its ends in threaded extensions which are adapted to be passed through the perforate ears at the corners of the plate and secured by nuts.

In testimony whereof I have hereunto set my hand and affixed my seal this 5th day of July, 1918.

RALPH F. ROGERS.

Copies of this patent may be obtained for five cents each, by addressing the "Commissioner of Patents, Washington, D. C."